United States Patent [19]

Oh

[11] Patent Number: 5,677,816
[45] Date of Patent: Oct. 14, 1997

[54] HEAD DRUM ASSEMBLY FOR USE IN A VIDEO CASSETTE RECORDER

[75] Inventor: Se-Woog Oh, Seoul, Rep. of Korea

[73] Assignee: Daewoo Electronics, Co., Ltd., Seoul, Rep. of Korea

[21] Appl. No.: 531,022

[22] Filed: Sep. 20, 1995

[30] Foreign Application Priority Data

Nov. 21, 1994 [KR] Rep. of Korea ............... 94-30559

[51] Int. Cl.$^6$ .................... G11B 5/52; G11B 21/04
[52] U.S. Cl. .................................................... 360/107
[58] Field of Search ........................... 360/84, 85, 107, 360/109

[56] References Cited

U.S. PATENT DOCUMENTS 4,890,177  12/1989  Katoh et al. ......................... 360/107
5,051,852   9/1991  Kohno et al. .......................... 360/84

FOREIGN PATENT DOCUMENTS 60-106018  6/1985  Japan ................................ 360/107

Primary Examiner—Robert S. Tupper
Assistant Examiner—William J. Klimowicz
Attorney, Agent, or Firm—Pennie and Edmonds, LLP

[57] ABSTRACT

The head drum assembly for use in a VCR, which is capable of preventing a resonance, comprises a rotating shaft, a flange, a rotary drum, a plurality of heads, an upper and a lower sets of bearings, a stationary drum, a motor rotor and a motor stator, a pre-pressing boss, and a flexible assembly and a rigid assembly. The flexible assembly and the rigid assembly are coupled, in turn, to a portion of the rotating shaft between the pre-pressing boss and a top surface of the motor rotor and to an end portion of the rotating shaft protruding from bottom of the motor rotor, respectively.

6 Claims, 5 Drawing Sheets

HEAD DRUM ASSEMBLY FOR USE IN A VIDEO CASSETTE RECORDER

FIELD OF THE INVENTION

The present invention relates to a head drum assembly for use in a video cassette recorder ("VCR"); and, more particularly, to an improved head drum assembly capable of preventing a resonance caused by electrical or mechanical disturbances having a specific frequency which is similar to the natural vibration frequency of the head drum assembly.

DESCRIPTION OF THE PRIOR ART

As shown in FIG. 1, a conventional head drum assembly for use in a VCR normally comprises a rotating shaft 10 divided into an upper part 101 and a lower part 102, a rotary drum 20, a plurality of heads 21, a flange 30 with a bottom surface 31, a stationary drum 40 having a top surface 41, a pre-pressing boss 50 having a bottom surface 51, a motor rotor 60 having a top and a bottom surfaces 61 and 62, a stator transformer 70, a rotor transformer 80, a motor stator 90 and an upper and a lower sets of bearings A and B.

The flange 30 is pressed in and fixed to the upper part 101 of the rotating shaft 10.

The rotary drum 20 is bolted onto the flange 30 and is adjoined to the upper part 101 of the rotating shaft 10 via the flange 30.

The upper and the lower sets of bearings A and B are arranged around the lower part 102 of the rotating shaft 10.

The stationary drum 40 is attached to the lower part 102 of the rotating shaft 10 through the upper and the lower sets of bearings A and B.

The plurality of heads 21 are secured to the rotary drum 20 through a plurality of fastening screws S.

Furthermore, the pre-pressing boss 50 is securely attached to the motor rotor 60 located at a lower end portion of the rotating shaft 10, and constantly presses against the lower set of bearings B. The motor stator 90 is located above the pre-pressing boss 50.

In addition, the rotor transformer 80 and the stator transformer 70 may be attached at the bottom surface 31 of the flange 30 and at the top surface 41 of the stationary drum 40 by using, e.g., a bonding agent, respectively.

In such a head drum assembly, the rotation of the rotary drum 20, the flange 30, the rotor transformer 80 and the plurality of heads 21 produces an upper polar moment of inertia, and the rotation of the motor rotor 60 and the pre-pressing boss 50 produces a lower polar moment of inertia, subjecting the rotating shaft 10 to a torsion, which tends to force the rotating shaft 10 to vibrate. It is known that combination of the upper polar moment of inertia, the lower polar moment of inertia and the vibration of the rotating shaft 10 gives rise to a natural vibration frequency of the head drum assembly.

If an electrical or mechanical disturbance having a specific frequency which is similar to the natural vibration frequency of the head drum assembly is introduced thereto during a recording or reproducing operation of the VCR, the head drum assembly will resonate, as shown in FIG. 2 illustrating the response of five head drum assemblies as a function of frequency, at or near the natural vibration frequency, resulting in a number of undesirable effects such as image distortions, color spreading, jitters or the like, to thereby adversely affecting the performance of the head drum assembly or the VCR.

SUMMARY OF THE INVENTION

It is, therefore, a primary object of the present invention to provide a head drum assembly with a capable of preventing a resonance caused by an electrical or mechanical disturbance having a frequency which is similar to a natural vibration frequency of the head drum assembly.

In accordance with the present invention, there is provided a head drum assembly for use in a VCR comprising: a rotating shaft divided into an upper and a lower parts; a flange with a bottom surface; a rotary drum adjoined to the upper part of the rotating shaft via the flange; a plurality of heads secured to the rotary drum; an upper and a lower sets of bearings arranged around the lower part of the rotating shaft; a stationary drum having a top surface attached to the lower part of the rotating shaft through the upper and the lower sets of bearings; a pre-pressing boss having a bottom surface, pressed in and fixed to the rotating shaft and constantly pressing the lower set of bearings; a motor rotor having a top and a bottom surfaces located at a lower end portion of the rotating shaft; a rotor transformer and a stator transformer attached at the bottom surface of the flange and at the top surface of the stationary drum, respectively; a motor stator located above the motor rotor; and a flexible assembly and a rigid assembly for preventing the resonance of the head drum assembly, wherein the flexible assembly and the rigid assembly are coupled, in turn, to a portion of the rotating shaft between the pre-pressing boss and the top surface of the motor rotor and to a lower end portion of the rotating shaft protruding from the bottom surface of the motor rotor, respectively.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
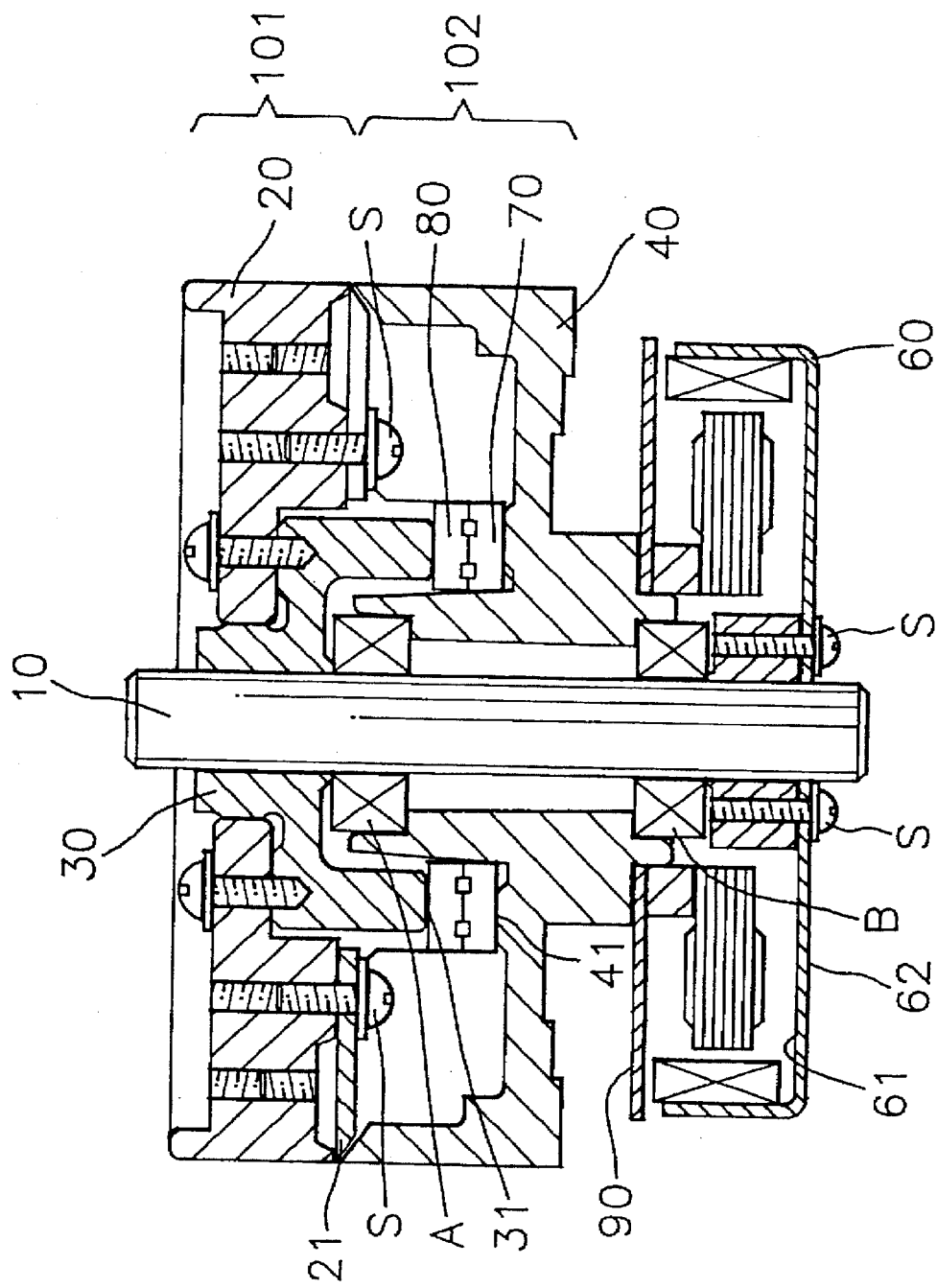
FIG. 1 shows a cross sectional view of the conventional head drum assembly.
Figure 2:
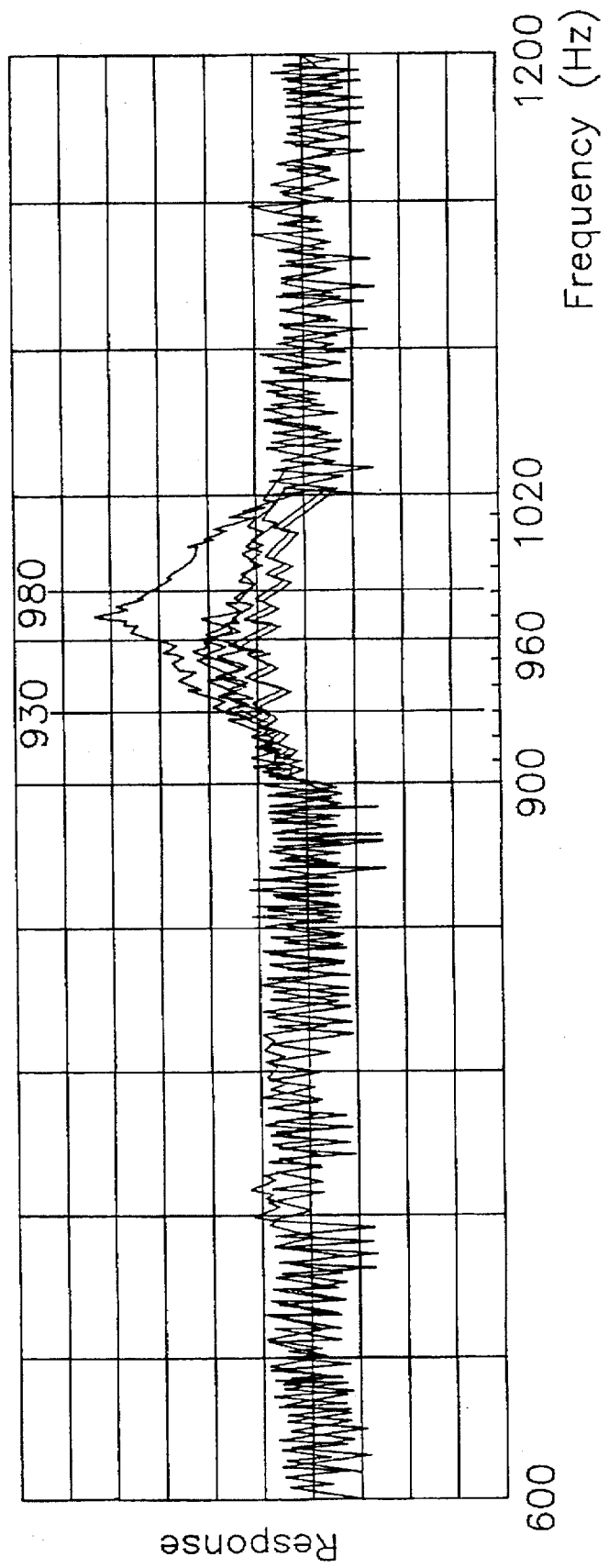
FIG. 2 represents a graph exemplifying the resonance in the five conventional head drum assemblies.

Although the main aspect of the inventive head drum assembly of the present invention is shown in FIGS. 3 to 5, FIG. 1 will be from time to time referenced in describing the inventive head drum assembly. Furthermore, like reference numerals representing same components will be used in FIGS. 1, 3 and 4.

The inventive head drum assembly in accordance with a preferred embodiment of the present invention will be described using FIGS. 1 and 3. The novel head drum assembly comprises a rotating shaft 10 divided into an upper part 101 and a lower part 102, a flange 30 with a bottom surface 31, a rotary drum 20, a plurality of heads 21, an upper and a lower sets of bearings A and B, a stationary drum 40 having a top surface 41, a pre-pressing boss 50 having a bottom surface 51, a motor rotor 60 having a top and a bottom surfaces 61 and 62, a rotor transformer 80, a stator transformer 70, a motor stator 90, a flexible assembly 200 and a rigid assembly 300.

The flange 30 is pressed and fixed to the upper part 101 of the rotating shaft 10.

The rotary drum 20 is bolted onto the flange 30 and is adjoined to the upper part 101 of the rotating shaft 10 via the flange 30.

The upper and the lower sets of bearings A and B are arranged around the lower part 102 of the rotating shaft 10.

The stationary drum 40 is attached to the lower part 102 of the rotating shaft through the upper and the lower sets of bearings A and B.

The plurality of heads 21 are secured to the rotary drum 20 through a plurality of fastening screws S.

The pre-pressing boss 50 is pressed in and fixed to a lower end portion of the rotating shaft 10, and presses constantly against the lower set of bearings B.

The motor stator 90 and the motor rotor 60 are located above and below the pre-pressing boss 50, respectively.

In addition, the flexible assembly 200 and the rigid assembly 300 for preventing resonance in the head drum assembly by absorbing the torsional vibrations of the rotating shaft 10, are coupled, in turn, to a portion of the rotating shaft 10 between the pre-pressing boss 50 and the top surface 61 of the motor rotor 60 and to the lower end portion of the rotating shaft 10 protruding from the bottom surface 62 of the motor rotor 60, respectively.

Figure 3:
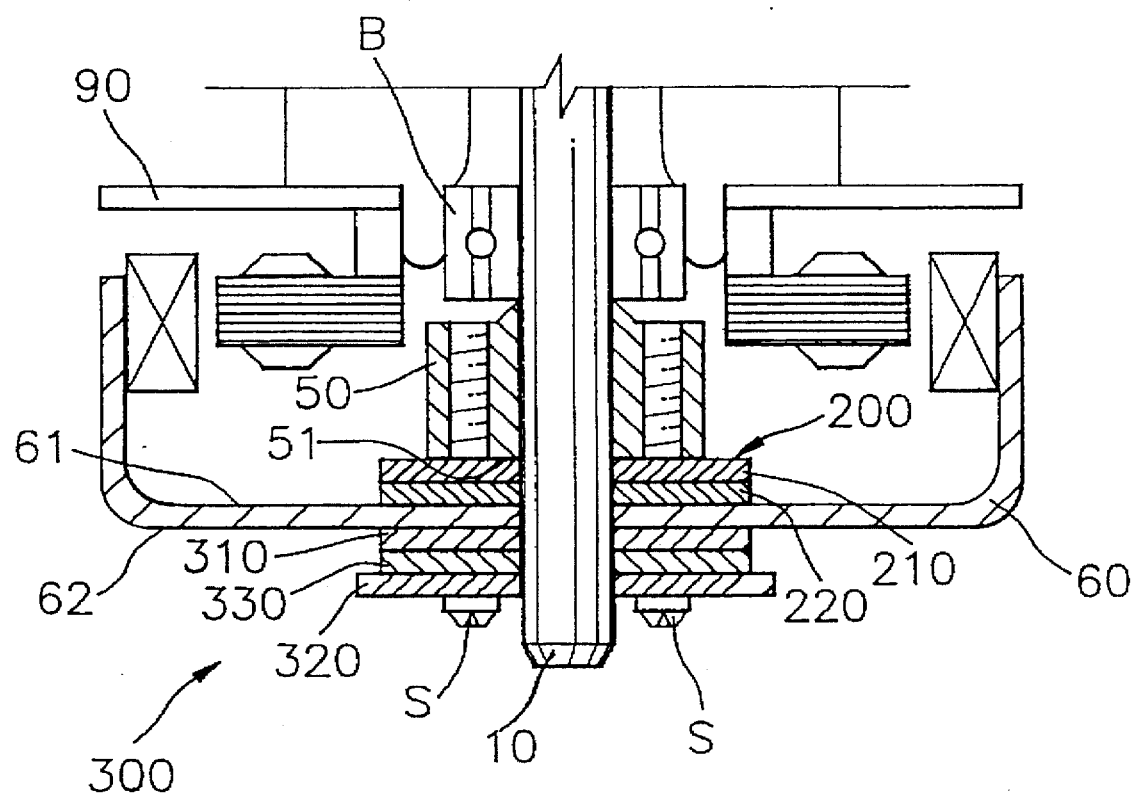
FIG. 3 illustrates a partial cross sectional view of the head drum assembly in accordance with a preferred embodiment of the present invention, showing a portion thereof containing a flexible and a rigid assemblies.

As shown in FIG. 3, the flexible assembly 200 comprises a first flexible plate, e.g., a rubber, 210 having a desired elasticity and a first flexible adhesive member 220. The first flexible plate 210 is closely attached to the bottom surface 51 of the pre-pressing boss 50 and the first flexible adhesive member 220 is interposed between the first flexible plate 210 and the top surface 61 of the motor rotor 60.

On the other hand, the rigid assembly 300 comprises a second flexible plate, e.g., a rubber, 310 having a desired elasticity, a second flexible adhesive-member 330 and a rigid plate 320 having a greater rigidity than the second flexible plate 310. The second flexible plate 310 is mounted immediately under the bottom surface 62 of the motor rotor 60 and the rigid plate 320 is mounted under the second flexible plate 310. In addition, the second flexible adhesive member 330 is interposed between the second flexible plate 310 and the rigid plate 320.

It is preferable that the flexible assembly 200 and the rigid assembly 300 be fixed to the pre-pressing boss 50 by using a plurality of screws S which are fitted through the motor rotor 60 from below and into the pre-pressing boss 50.

In addition, the rotor transformer 80 and the stator transformer 70 may be attached on the bottom surface 31 of the flange 30 and at the top surface 41 of the stationary drum 40 by using, e.g., a bonding agent, respectively.

Figure 5:
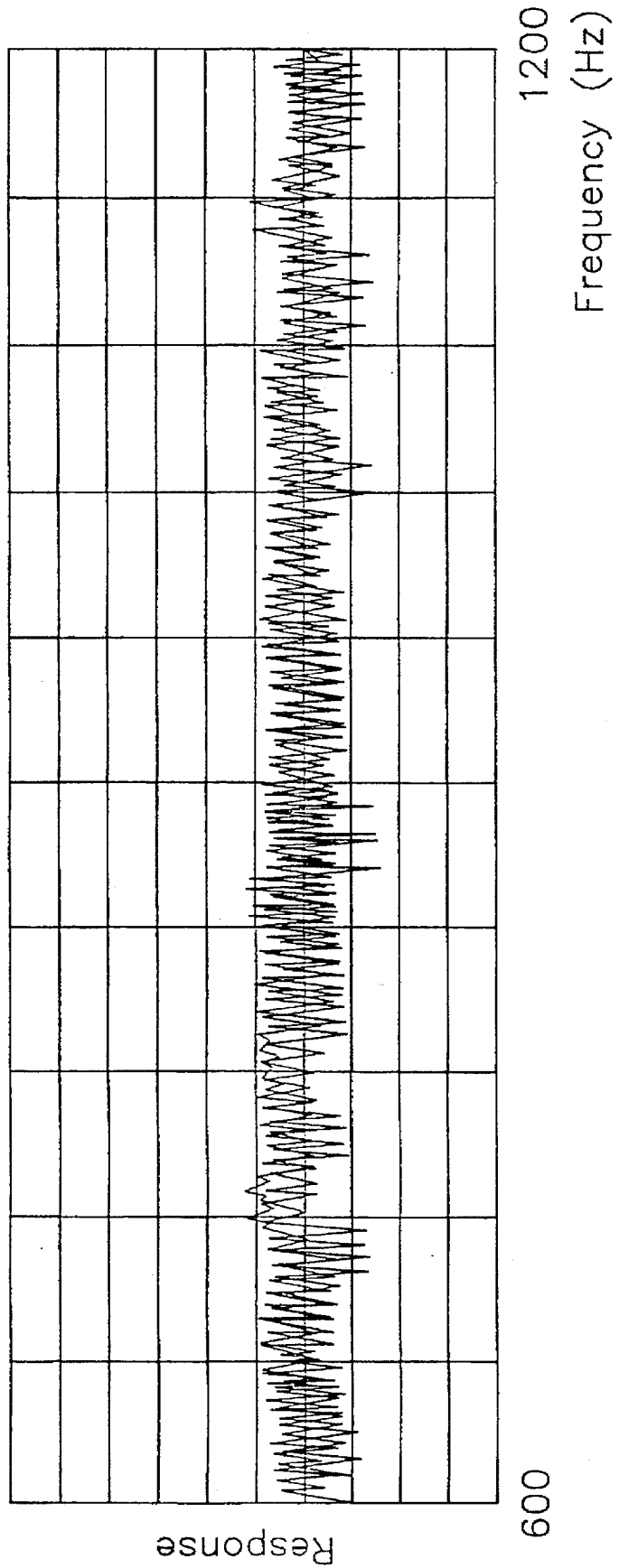
FIG. 5 presents a graph demonstrating the absence of a resonance in the five inventive head drum assemblies as a result of incorporating therein the flexible and the rigid assemblies.

In the inventive head drum assembly of the first embodiment of the present invention, the flexible assembly 200 and the rigid assembly 300 absorb a torsional vibration of the rotating shaft 10 produced by an upper and a lower polar moments of inertia resulting from the rotation of the rotary drum 20, the flange 30, the rotor transformer 70 and the plurality of heads 21 and the rotation of the motor rotor 60 and the pre-pressing boss 50, respectively, thereby preventing the inventive head drum assembly from resonating as shown in FIG. 5 illustrating the response of five inventive head drum assemblies as a function of frequency.

Figure 4:
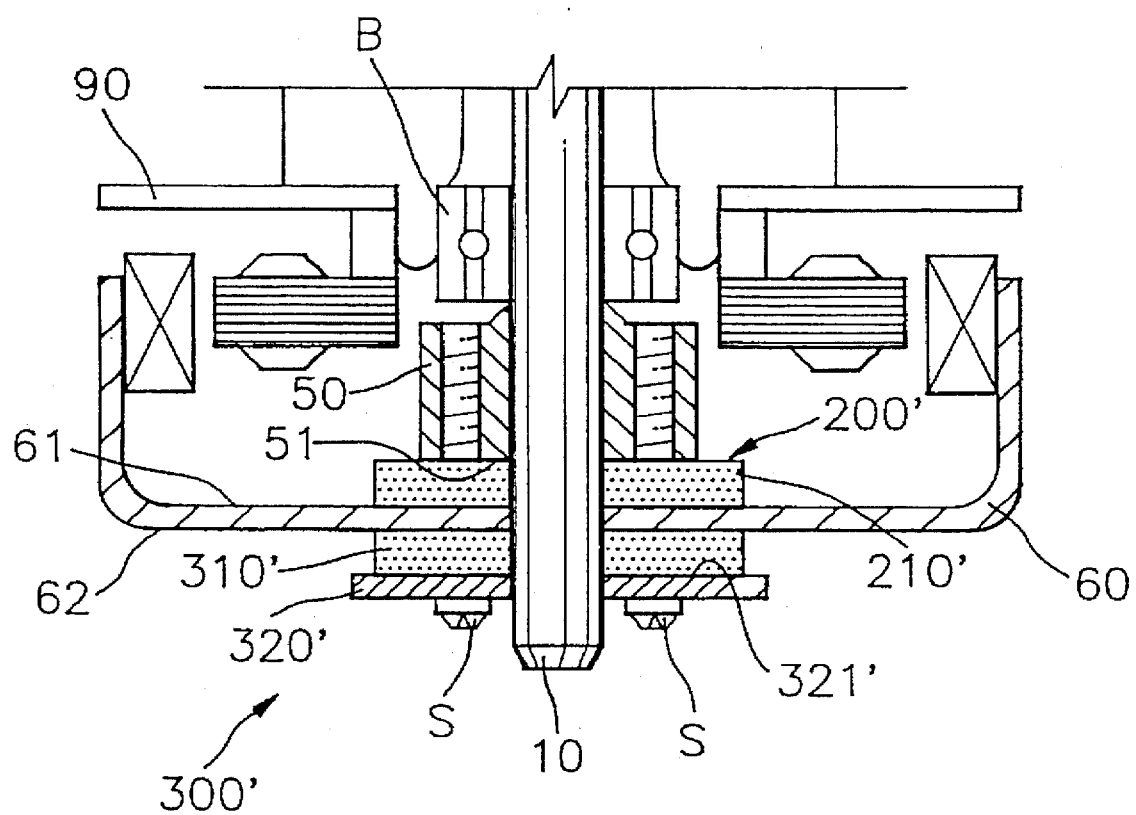
FIG. 4 depicts a partial cross sectional view of the head drum assembly in accordance with another preferred embodiment of the present invention, showing a portion thereof with a flexible and a rigid assemblies.

The inventive head drum assembly in accordance with another preferred embodiment of the present invention will now be described with reference to FIGS. 1 and 4. This embodiment is similar to the first preferred embodiment except that a first flexible assembly 200' is comprised of a first flexible material 210' of a desired thickness coated between the bottom surface 51 of the pre-pressing boss 50 and the top surface 61 of the motor rotor 60, and a rigid assembly 300' is comprised of a rigid plate 320' coupled to the lower end portion of the rotating shaft 10 and a second flexible material 310' of a desired thickness coated between a top surface 321' of the rigid plate 320' and the bottom surface 62 of the motor rotor 60.

In addition, it is preferable that the flexible assembly 200' and the rigid assembly 300' be fixed to the pre-pressing boss 50 by using a plurality of screws S which are fitted through the motor rotor from below and into the pre-pressing boss 50.

By incorporating the flexible assembly 200' and the rigid assembly 300', in the head drum assembly of the second embodiment, the resonance thereof is also prevented.

Although the invention has been shown and described with respect to the preferred embodiments, it will be understood by those skilled in the art that various changes and modifications may be made without departing from scope of the invention as defined in the following claims.

What is claimed is:

1. A head drum assembly for use in a video cassette recorder capable of preventing a resonance caused by an electrical or mechanical disturbance having a frequency which is similar to a natural vibration frequency of the head drum assembly, which comprises:

a rotating shaft divided into an upper part and a lower part;

a flange with a bottom surface pressed in and fixed to the upper part of the rotating shaft;

a rotary drum bolted onto the flange and adjoined to the upper part of the rotating shaft via the flange;

a plurality of heads secured to the rotary drum;

an upper and a lower sets of bearings arranged around the lower part of the rotating shaft;

a stationary drum having a top surface attached to the lower part of the rotating shaft through the upper and the lower sets of bearings;

a pre-pressing boss having a bottom surface, pressed in and fixed to the rotating shaft, said pre-pressing boss constantly pressing against the lower set of bearings;

a motor rotor having a top and a bottom surfaces located at a lower end portion of the rotating shaft;

a rotor transformer and a stator transformer attached at the bottom surface of the flange and at the top surface of the stationary drum, respectively;

a motor stator located above the motor rotor; and a flexible assembly and a rigid assembly for preventing the resonance of the head drum assembly, said flexible assembly being coupled to a portion of the rotating shaft between the pre-pressing boss and a top surface of the motor rotor and said rigid assembly being coupled to a lower end portion of the rotating shaft protruding from the bottom surface of the motor rotor, wherein the flexible assembly includes a first flexible plate closely attached to the bottom surface of the pre-pressing boss, the first flexible plate having a desired elasticity and a first flexible adhesive member interposed between the first flexible plate and the top surface of the motor rotor; and wherein the rigid assembly includes a second flexible plate attached to the bottom surface of the motor rotor, the second flexible plate having a desired elasticity, a rigid plate located under the second flexible plate, the rigid plate having a greater rigidity than the second plate and a second flexible adhesive member interposed between the second flexible plate and the rigid plate, the second flexible adhesive member integrating the second flexible plate and the rigid plate together.

2. The head drum assembly as recited in claim 1, wherein the first flexible plate and the second flexible plate are formed of a same material.

3. The head drum assembly as recited in claim 1 or 2, wherein both the flexible assembly and the rigid assembly are fixed to the pre-pressing boss.

4. A head drum assembly for use in a video cassette recorder capable of preventing a resonance caused by an electrical or mechanical disturbance having a frequency which is similar to a natural vibration frequency of the head drum assembly, which comprises:

a rotating shaft;

a rotary drum fixed to the rotating shaft so that the rotary drum rotates when the rotating shaft rotates;

a stationary drum attached to the rotating shaft through bearings;

a pre-pressing boss having a bottom surface pressed in and fixed to the rotating shaft;

a motor rotor having a top and a bottom surfaces located at a lower end portion of the rotating shaft; and a flexible assembly and a rigid assembly for preventing the resonance of the head drum assembly, wherein the flexible assembly includes a first flexible plate closely attached to the bottom surface of the pre-pressing boss, the first flexible plate having a desired elasticity, and a first flexible adhesive member interposed between the first flexible plate and the top surface of the motor rotor, and the rigid assembly includes a second flexible plate attached to the bottom surface of the motor rotor, the second flexible plate having a desired elasticity, a rigid plate located under the second flexible plate, the rigid plate having a greater rigidity than the second flexible plate and a second flexible adhesive member interposed between the second flexible plate and the rigid plate, the second flexible adhesive member integrating the second flexible plate and the rigid plate together.

5. The head drum assembly as recited in claim 4, wherein the first flexible plate and the second flexible plate are made of a same material.

6. The head drum assembly as recited in claim 4, wherein both the flexible assembly and the rigid assembly are fixed to the pre-pressing boss.

* * * * *